US006940504B1

(12) United States Patent
Mech et al.

(10) Patent No.: US 6,940,504 B1
(45) Date of Patent: Sep. 6, 2005

(54) RENDERING VOLUMETRIC FOG AND OTHER GASEOUS PHENOMENA USING AN ALPHA CHANNEL

(75) Inventors: Radomir Mech, Mountain View, CA (US); Angus Dorbie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 09/991,526

(22) Filed: Nov. 21, 2001

Related U.S. Application Data

(60) Provisional application No. 60/252,092, filed on Nov. 21, 2000.

(51) Int. Cl.[7] .............................................. G06T 15/00
(52) U.S. Cl. ..................................................... 345/419
(58) Field of Search ................................. 345/426, 419, 345/420, 421, 422, 423, 424, 427, 428, 473, 345/592, 622, 629, 958

(56) References Cited

U.S. PATENT DOCUMENTS

| 5,268,996 A | 12/1993 | Steiner et al. |
| 5,357,579 A | 10/1994 | Buchner et al. |
| 5,412,773 A | 5/1995 | Carlucci et al. |
| 5,706,481 A | 1/1998 | Hannah et al. |
| 6,078,332 A | 6/2000 | Ohazama |
| 6,184,857 B1 | 2/2001 | Latham |
| 6,268,861 B1 | 7/2001 | Sanz-Pastor et al. |
| 6,330,000 B1 | 12/2001 | Fenney et al. |
| 6,437,781 B1 | 8/2002 | Tucker et al. |
| 6,529,193 B1 | 3/2003 | Herken et al. |
| 6,545,685 B1 * | 4/2003 | Dorbie ....................... 345/582 |
| 6,580,430 B1 * | 6/2003 | Hollis et al. ................ 345/473 |
| 2001/0030648 A1 * | 10/2001 | Deering ...................... 345/426 |

OTHER PUBLICATIONS

Heidrich, et al.; "Applications of Pixel Textures in Visualization and Realistic Image Synthesis"; 1999 Symposium on Interactive 3D Graphics Atlanta GA USA; pp. 127-134.
Legakis, "Fast Multi-Layer Fog"; Computer Graphics Annual Conference Series, 1998; 3 pages.
Goodman; "Introduction to Fourier Optics Spatial Filtering and Optical Information Processing"; 1968; Library of Congress Catalog Card No.: 68-17184; pp. 149-154.

* cited by examiner

Primary Examiner—Mark Zimmerman
Assistant Examiner—Enrique L. Santiago
(74) Attorney, Agent, or Firm—Lee & Hayes, PLLC

(57) ABSTRACT

A system, method, and computer program product for rendering gaseous volumetric objects scenes using an alpha channel. In one described implementation, the method determines a distance between a user to boundaries of a gaseous volume and then stores the distance in an alpha channel to arrive at an alpha value. Then the alpha value can be used as a factor assist in blending scene colors with gaseous colors to render virtually realistic pixels for the gaseous object from the perspective of a user's view of the object. The resulting scenes can then be used to simulate patchy fog, clouds, or other gases of more or less constant density and color.

30 Claims, 13 Drawing Sheets

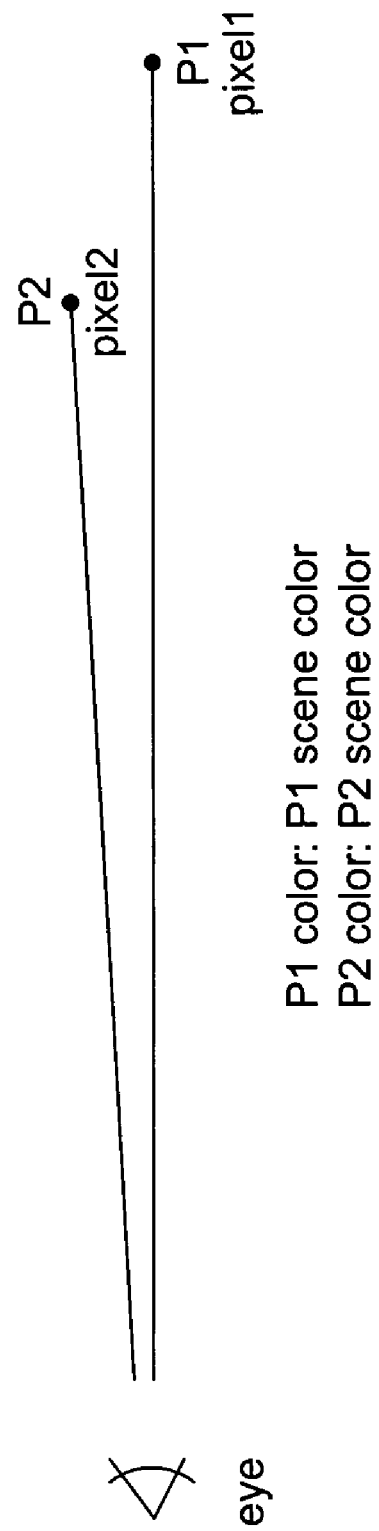

US 6,940,504 B1

RENDERING VOLUMETRIC FOG AND OTHER GASEOUS PHENOMENA USING AN ALPHA CHANNEL

CROSS-REFERENCE TO RELATED APPLICATIONS

The present application claims benefit of U.S. Provisional Application No. 60/252,092, filed Nov. 21, 2000. This patent application is also related to the following two co-pending and commonly-owned applications:
1. R. Mech, "Rendering Volumetric Fog and Other Gaseous Phenomena", U.S. patent application Ser. No. 09/990,085 filed concurrently herewith on Nov. 21, 2001 and (incorporated in its entirety herein by reference); and
2. R. Mech, "Method, System, and Computer Program Product for Rendering Multicolored Layered Fog with Self-Shadowing and Scene Shadowing", U.S. patent application Ser. No. 09/990,082, filed concurrently herewith on Nov. 21, 2001 and (incorporated in its entirety herein by reference).

TECHNICAL FIELD

This invention relates to the field of graphics systems and the presentation of visually realistic images.

BACKGROUND

Computer graphics systems are used in many game and simulation applications. For example, flight simulators use graphics systems to present scenes that a pilot would be expected to see if he or she were flying in an actual aircraft cockpit. Several key techniques used to achieve visual realism include antialiasing, blending, polygon offset, lighting, texturizing, and atmospheric effects. Atmospheric effects such as fog, smoke, smog, and other gaseous phenomena are particularly useful because they create the effect of objects appearing and fading at a distance. This effect is what one would expect as a result of movement. Gaseous phenomena are especially important in flight simulation applications because they help to train pilots to operate in and respond to conditions of limited visibility.

Quite a few methods for creating realistic images of fog, clouds and other gaseous phenomena have been developed in the past. Most of these techniques focus on computing the light distribution through the gas and present various methods of simulating the light scattering from the particles of the gas. Some resolve multiple scattering of light in the gas and others consider only first order scattering (the scattering of light in the view direction) and approximate the higher order scattering by an ambient light. A majority of the techniques use ray-tracing, voxel-traversal, or other time-consuming algorithms to render the images. Taking advantage of the current graphics hardware some of the techniques are approaching interactive frame rates.

One approach renders clouds and light shafts by blending a set of billboards, representing metaballs. The rendering times range from 10 to 30 seconds for relatively small images. Another approach renders gases by blending slices of the volume in the view direction. Using 3D textures, a near real-time frame rate is achieved. This is especially true for smaller images. Unfortunately, both these techniques are fill-limited, i.e., the number and the size of the rendered semi-transparent polygons is limited by the number of pixels hardware can render per second. Even on the fastest machines it is not possible to render too many fill-screen polygons per frame. The techniques may be suitable for rendering smaller local objects, e.g., a smoke column or a cloud, but even then the performance can suffer when the viewer comes too close to the object and the semitransparent polygons fill the whole screen. In the case of a patchy fog that can be spread across a large part of the scene the number of slices would be simply too large.

In real-time animations, smoke and clouds are usually simulated by mapping transparent textures on a polygonal object that approximates the boundary of the gas. Although the texture may simulate different densities of the gas inside the 3D boundary and compute even the light scattering inside the gas, it does not change, when viewed from different directions, and it does not allow movement through the gas without sharp transitions. Consequently, these techniques are suitable for rendering very dense gases or gases viewed from a distance. Other methods simplify their task by assuming constant density of the gas at a given elevation, thereby making it possible to use 3D textures to render the gas in real time. The assumption, however, prevents using the algorithm to render patchy fog.

SUMMARY

A system, method, and computer program product for rendering gaseous volumetric objects using an alpha channel. In one described implementation, the method determines a distance between a user to boundaries of a gaseous volume and then stores the distance in an alpha channel to arrive at an alpha value. Then the alpha value can be used as a factor assist in blending scene colors with gaseous colors to render virtually realistic pixels for the gaseous object from the perspective of a user's view of the object.

BRIEF DESCRIPTION OF THE DRAWINGS

FIGS. 7A, 7B, 7C, 7D, 7E and 7F are diagrams of example bounded fog regions.

DETAILED DESCRIPTION

Figure 1:
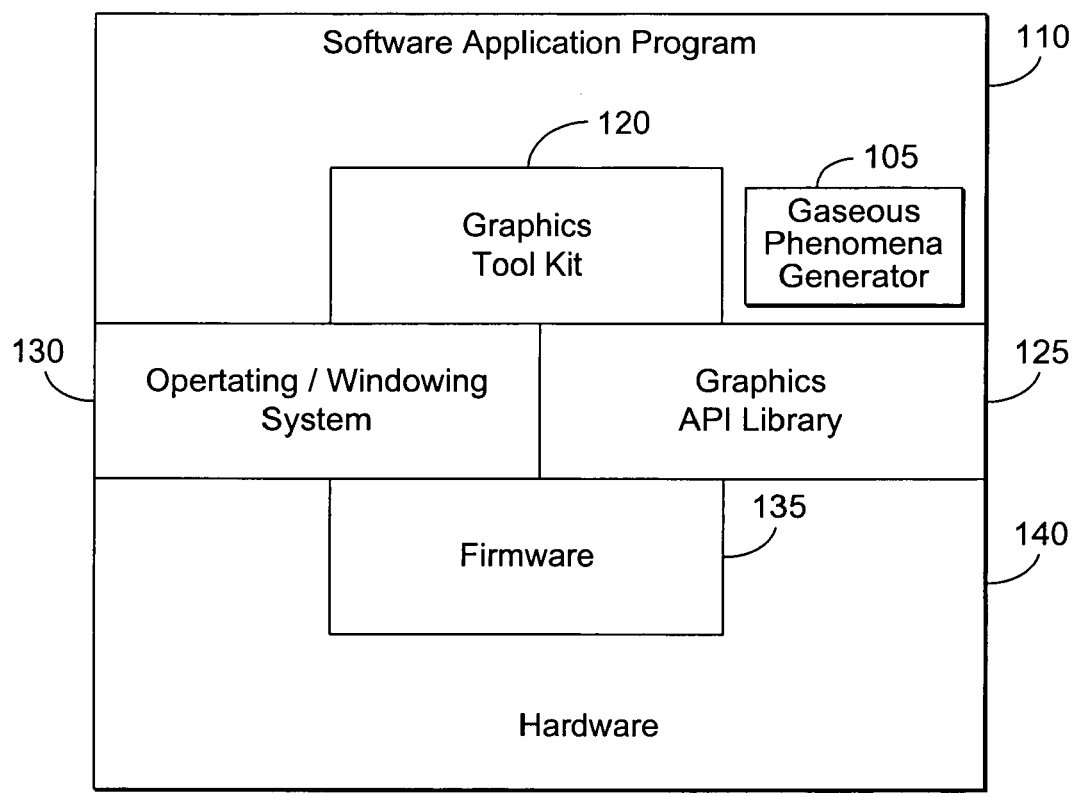
FIG. 1 is a block diagram of a computer architecture.

The following description describes various implementations for rendering volumetric fog or other gaseous phenomena. Volume object data is received that defines at least one three-dimensional bounded volume region. Travel distance information is then obtained in an alpha channel. The travel distance information is a function of component distances within three-dimensional bounded volume regions that lie between a respective pixel and a reference point. Each component distance is a segment that lies within at least a portion of a respective volume region.

In one exemplary implementation, the travel distance information is equal to total travel distance information. Total travel distance information is the sum of component distances that extend along a ray between a respective pixel and a reference point, where each component distance is a maximum distance along the ray within a respective volume region. In another implementation, a scaled total travel distance information is obtained in the alpha channel. The scaled total travel distance information is equal to the total travel distance information scaled relative to a range distance of a scene being rendered and a fogscale value. The range distance is defined as the distance between a minimum plane Z and a maximum distance plane M. The fogscale value is a variable that can be user-defined or set to a default value to provide further control over scaling.

In another implementation, travel distance information is obtained in the alpha channel by performing arithmetic operations in multiple passes through a graphics subsystem. Intermediate results of each pass are accumulated and stored in an alpha buffer until the travel distance information is obtained.

Once the travel distance information is obtained in the alpha buffer, the method converts the travel distance information to a fog factor. A scene is then rendered based on a blending of the scene color and the fog factor. In this way, a computer graphics image of a scene is displayed that depicts the volumetric fog or other gaseous phenomena rapidly, with high quality realism. This approach can be carried out quickly at a real-time rates.

In another described implementation a multipass routine includes pixel texture processing steps that can be carried out in an OPENGL® graphics environment having a pixel texture extension. This OPENGL® graphics environment includes a texture coordinate generator (also called texgen). In this environment, the method includes steps of initializing the texgen and setting a one-dimensional texture to a range of texel values extending from a minimum value to a maximum value.

A stencil value is set (e.g., the stencil bit is set to equal 1) to indicate when a corresponding pixel is inside a volume region.

For each pixel, component distance information is added or subtracted in the alpha buffer until a result is obtained that is representative of travel distance information. Example component distances include intervening back face distance information and/or intervening-front face distance information. Scaled total travel distance information is obtained in an alpha buffer for a pixel by adding scaled intervening back face distance information, adding scaled pixel distance information (if the pixel is inside a volume region), and subtracting scaled intervening front face distance information.

In one system implementation, a one-dimensional texture is stored with texels having values ranging from a minimum to a maximum (e.g., from 0 to 255 if 8 bits are used). The texture coordinate generator receives a distance value (such as, a pixel coordinate or a coordinate of a boundary point of a volume region) and generates one or more corresponding one-dimensional texture coordinates. The one or more dimensional texture coordinates may be used to sample a respective texel in the one-dimensional texture. The sampled texel value is then stored in an alpha channel of an alpha buffer corresponding to a respective pixel. In this way, distance information can be processed in pixel texture processing hardware with an output provided to an alpha buffer.

As used herein:

"Image" or "scene" means an array of data values. A typical image might have red, green, blue, and/or alpha pixel data, or other types of pixel data information as known to a person skilled in the relevant art.

"Pixel" means a data structure used to represent a picture element. Any type of pixel format can be used.

"Real-time" refers to a rate at which successive display images can be redrawn without undue delay upon a user or application. This interactive rate can include, but is not limited to, a rate equal to or less than approximately 120 frames per second. In a preferred implemenation, an interactive rate is equal to or less than 60 frames per second. In some examples, real time can be one update per second.

FIG. 1 illustrates a block diagram of an exemplary computer architecture 100 implementation. Architecture 100 includes six overlapping layers. Layer 110 represents a high level software application program. Examples of such software application programs include visual simulation applications, computer games or any other application that could be made to take advantage of computer generated graphics. Layer 120 represents a three-dimensional (3D) graphics software tool kit, such as OPENGL® PERFORMER, available from Silicon Graphics, Incorporated, Mountain View, Calif. Layer 125 represents a graphics application program interface (APT), which can include but is not limited to OPENGL® software, available from Silicon Graphics, Incorporated. Layer 130 represents system support such as operating system and/or windowing system support. Examples of such support systems include the LINUX®, UNIX® and Windows® operating/windowing systems. Layer 135 represents firmware which can include proprietary computer code. Finally, layer 140 represents hardware, including graphics hardware. Hardware can be any hardware or graphics hardware including, but not limited to, a computer graphics processor (single chip or multiple chip), a specially designed computer, an interactive graphics machine, a gaming platform, a low end game system, a game console, a network architecture, server, et cetera. Some or all of the layers 110–140 of architecture 100 will be available in most commercially available computers.

Various operational features described herein can be implemented in any one of the layers 110–140 of architecture 100, or in any combination of layers 110–140 of architecture 100.

In one implementation, a gaseous phenomena generator module 105 is provided. The gaseous phenomena generator module 105 provides control steps necessary to carry out routine 400 (described in detail below). The gaseous phenomena generator module 105 can be implemented in software, firmware, hardware, or in any combination thereof. As shown in FIG. 1, in one example implementation gaseous phenomena generator module 105 is control logic (e.g., software) that is part of application layer 110 and provides control steps necessary to carry out routine 400. In alternative implementations, gaseous phenomena generator 105 can be implemented as control logic in any one of the layers 110–140 of architecture 100, or in any combination of layers 110–140 of architecture 100.

Figure 2:
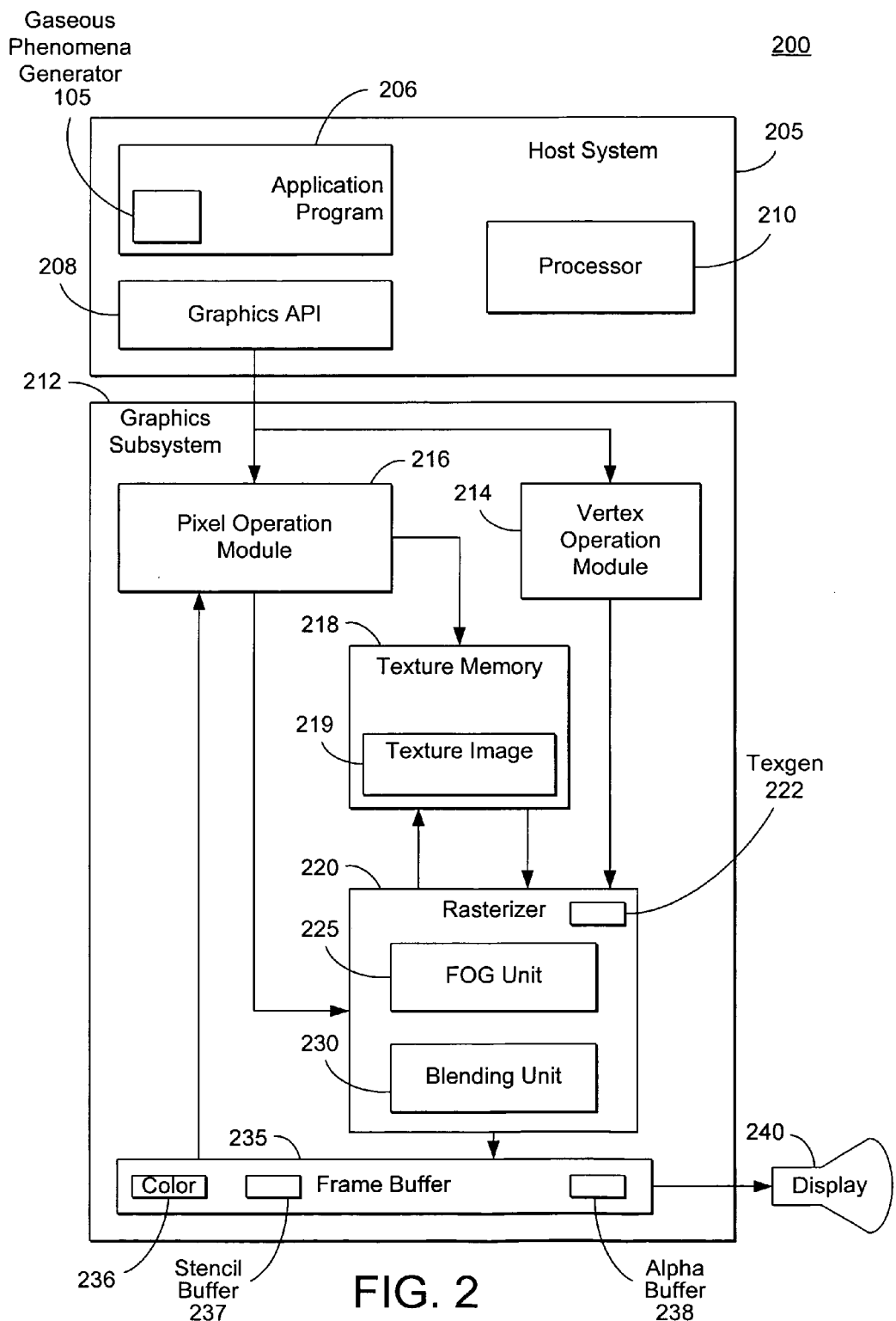
FIG. 2 illustrates a host and graphics subsystem.

FIG. 2 illustrates an example graphics system 200. Graphics system 200 includes a host system 205, a graphics subsystem 212, and a display 240.

Host system 205 comprises an application program 206, a hardware interface or graphics API 208, and a processor 210. Application program 206 can be any program requiring the rendering of a computer image or scene. The computer code of application program 206 is executed by processor 210. Application program 206 accesses the features of graphics subsystem 212 and display 240 through hardware interface or graphics API 208. As shown in FIG. 2, in one example implementation gaseous phenomena generator module 105 is control logic (e.g., software) that is part of application 206.

Graphics subsystem 212 comprises a vertex operation module 214, a pixel operation module 216, a rasterizer 220, a texture memory 218, and a frame buffer 235. Frame buffer 235 includes a color buffer 236, a stencil buffer 237, and an alpha buffer 238. Texture memory 218 can store one or more texture images 219. Rasterizer 220 includes a texture coordinate generator (texgen 222), fog unit 225, and a blending unit 230.

Texgen 222 can carry out steps 420 (including steps 528, 534, and 544) as would be apparent to a person skilled in the art given this entire description. Texgen 222 is passed a coordinate value and generates a scaled texel coordinate value equal to or between 0 and 1 that is a function of distance information (such as, back face distance information, pixel distance information and/or front face distance information) as described further below. Texgen 222 then samples the texture and obtains a texel value in the one-dimensional texture based on the generated scaled texel coordinate value and passes the sampled texel value to an alpha channel of a corresponding pixel.

Fog unit 225 can obtain either linear or non-linear fog color values and can carry out step 430 described below. Blending unit 230 blends the fog color values and/or pixel values to produce a single pixel color for a respective pixel. Blending unit 230 can carry out step 440 described below. The output of blending module 230 is stored in frame buffer 235. Display 240 can be used to display images or scenes stored in frame buffer 235.

Figure 3:
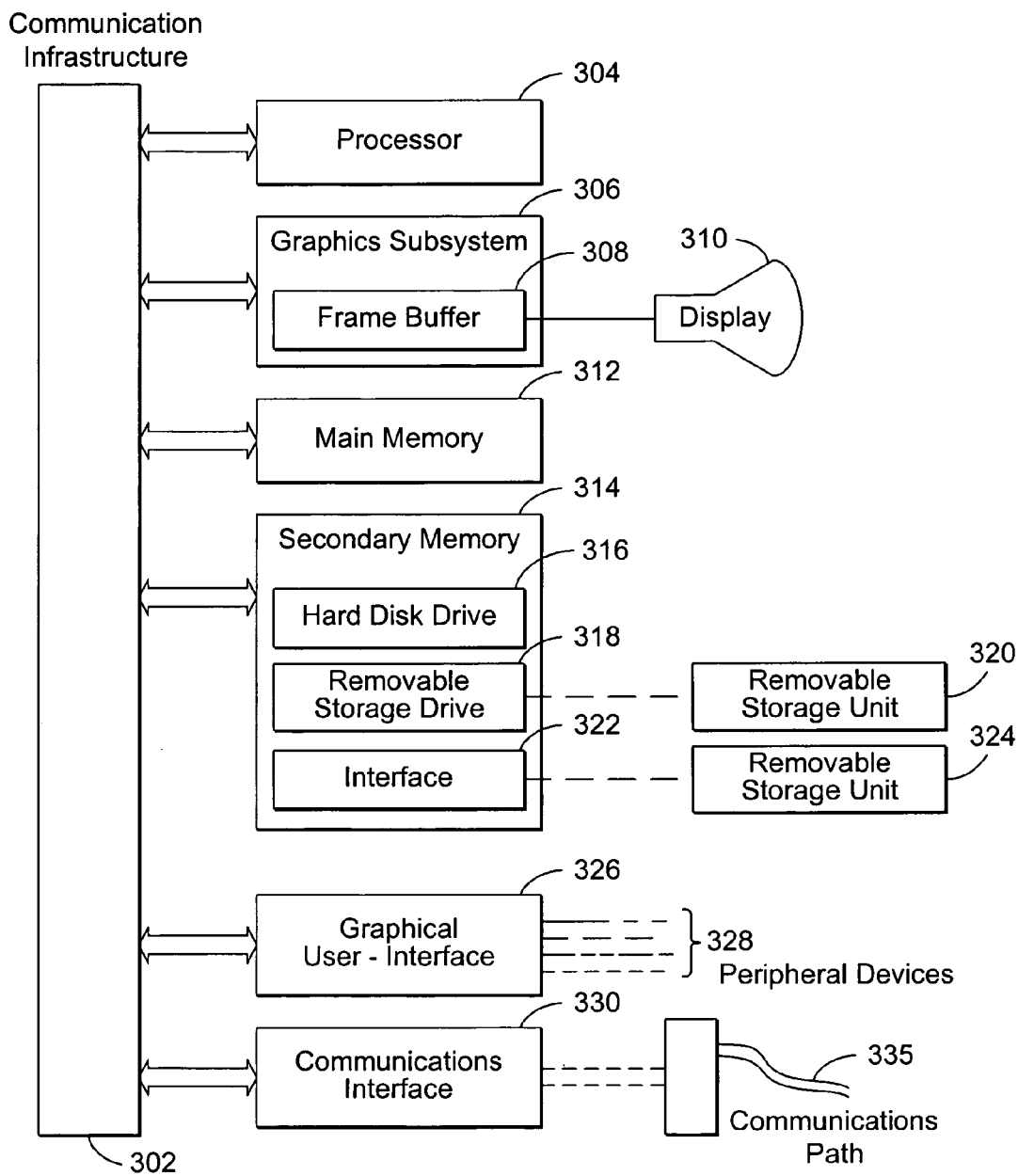
FIG. 3 illustrates a computer system.

Referring to FIG. 3, an example of a computer system 300 is shown, which can be used to implement an exemplary computer program product. Computer system 300 represents any single or multi-processor computer. Single-threaded and multi-threaded computers can be used. Unified or distributed memory systems can be used.

Computer system 300 includes one or more processors, such as processor 304, and one or more graphics subsystems, such as graphics subsystem 306. One or more processors 304 and one or more graphics subsystems 306 can execute software and implement all or part of the features described herein. Graphics subsystem 306 can be implemented, for example, on a single chip as a part of processor 304, or it can be implemented on one or more separate chips located on a graphics board. Each processor 304 is connected to a communication infrastructure 302 (e.g., a communications bus, cross-bar, or network). After reading this description, it will become apparent to a person skilled in the relevant art how to implement the invention using other computer systems and/or computer architectures.

Computer system 300 also includes a main memory 312, preferably random access memory (RAM), and can also include secondary memory 314. Secondary memory 314 can include, for example, a hard disk drive 316 and/or a removable storage drive 318, representing a floppy disk drive, a magnetic tape drive, an optical disk drive, etc. The removable storage drive 318 reads from and/or writes to a removable storage unit 320 in a well-known manner. Removable storage unit 320 represents a floppy disk, magnetic tape, optical disk, etc., which is read by and written to by removable storage drive 318. As will be appreciated, the removable storage unit 320 includes a computer usable storage medium having stored therein computer software and/or data.

In alternative implementations, secondary memory 314 may include other similar means for allowing computer programs or other instructions to be loaded into computer system 300. Such means can include, for example, a removeable storage unit 324 and an interface 322. Examples can include a program cartridge interface (such as that found in video game devices), a removeable memory chip (such as an EPROM, or PROM) and associated socket, and other removeable storage units 324 and interfaces 322 which allow software and data to be transferred from the removable storage unit 324 to computer system 300.

In an implemenation, computer system 300 includes a frame buffer 308 and a display 310. Frame buffer 308 is in electrical communication with graphics subsystem 306. Images stored in frame buffer 308 can be viewed using display 310.

Computer system 300 can also include a communications interface 330. Communications interface 330 allows software and data to be transferred between computer system 300 and external devices via communications path 335. Examples of communications interface 330 can include a modem, a network interface (such as Ethernet card), a communications port, etc. Software and data transferred via communications interface 330 are in the form of signals which can be electronic, electromagnetic, optical or other signals capable of being received by communications interface 330, via communications path 335. Note that communications interface 330 provides a means by which computer system 300 can interface to a network such as the Internet.

Computer system 300 can include one or more peripheral devices 328, which are coupled to communications infrastructure 302 by graphical user-interface 326. Example peripheral devices 328, which can from a part of computer system 300, include, for example, a keyboard, a pointing device (e.g., a mouse), a joy stick, and a game pad. Other peripheral devices 328, which can form a part of computer system 300 will be known to a person skilled in the relevant art given the description herein.

Many of the described operations herein could also be implemented using software running (that is, executing) in an environment similar to that described above with respect to FIG. 3. In this document, the term "computer program product" is used to generally refer to removable storage unit 320, a hard disk installed in hard disk drive 318, or a carrier wave or other signal carrying software over a communication path 335 (wireless link or cable) to communication interface 330. A computer useable medium can include magnetic media, optical media, or other recordable media, or media that transmits a carrier wave. These computer program products are means for providing software to computer system 300.

Computer programs (also called computer control logic) are stored in main memory 312 and/or secondary memory 314. Computer programs can also be received via communications interface 330. Such computer programs, when executed, enable the computer system 300 via processor 304 to perform as described herein. Accordingly, such computer programs represent controllers of the computer system 300.

In an implementation using software, the software may be stored in a computer program product and loaded into computer system 300 using removable storage drive 318, hard drive 316, or communications interface 330. Alternatively, the computer program product may be downloaded to computer system 300 over communications path 335. The control logic (software), when executed by the one or more processors 304, causes the processor(s) 304 to perform the functions as described herein.

Another exemplary implementation is accomplished primarily in firmware and/or hardware using, for example, hardware components such as application specific integrated circuits (ASICs). Implementation of a hardware state machine so as to perform the functions described herein is also possible.

Figure 4:
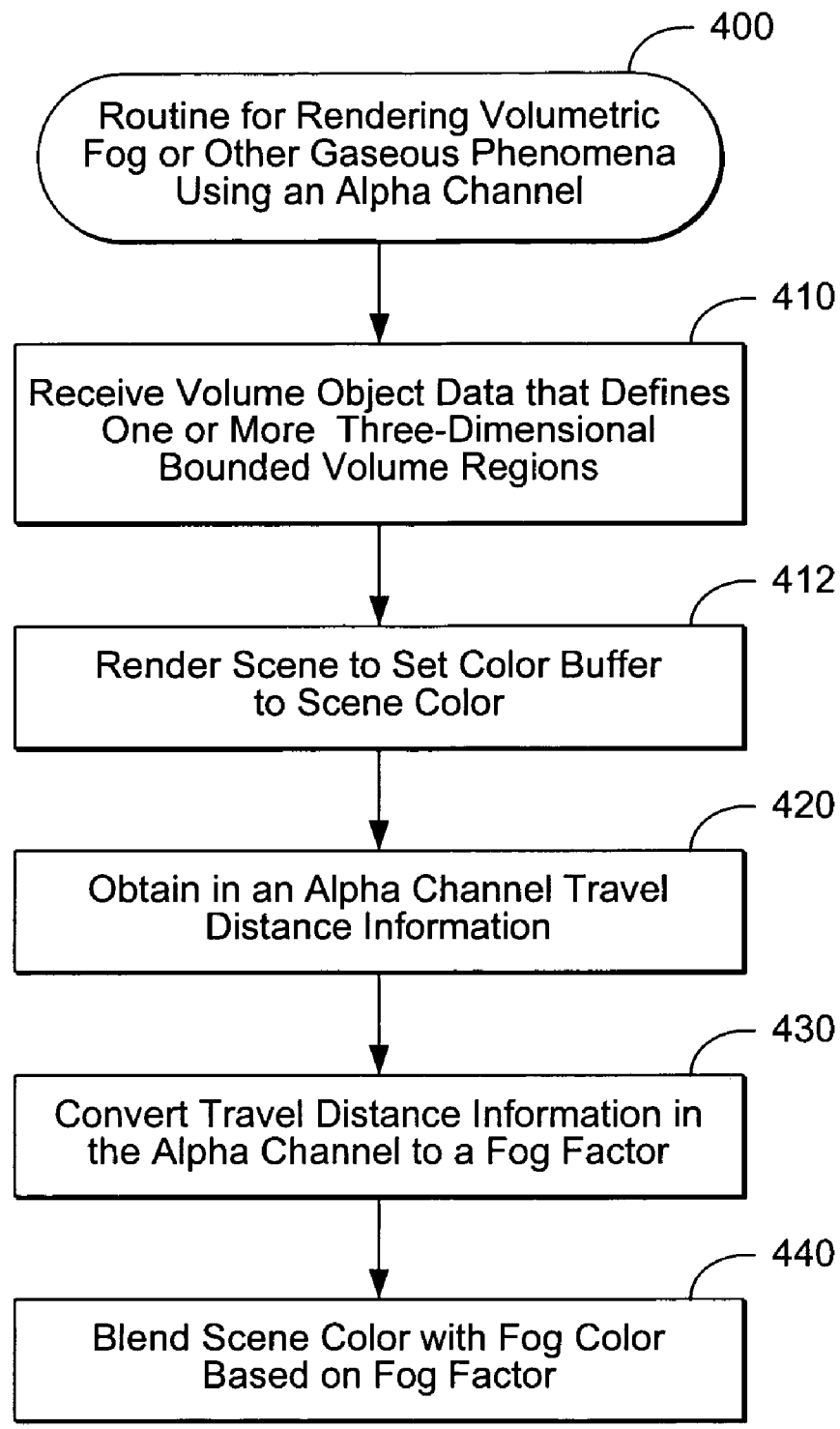
FIG. 4 is a flowchart illustrating a routine for rendering volumetric fog or other gaseous phenomena using an alpha channel.
Figure 5A:
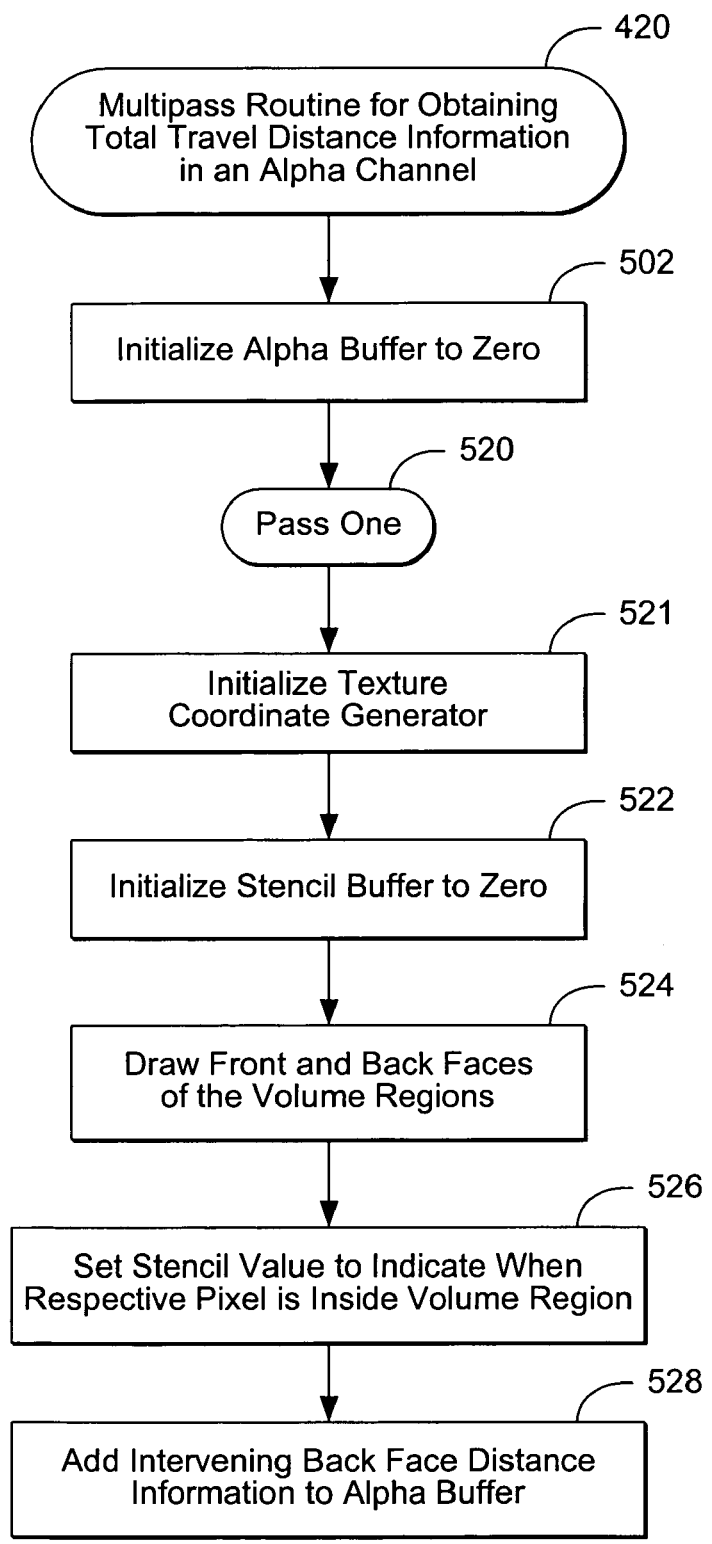
FIGS. 5A and 5B are a flowchart diagram of a multipass routine for obtaining total travel distance information in an alpha channel.
Figure 5B:
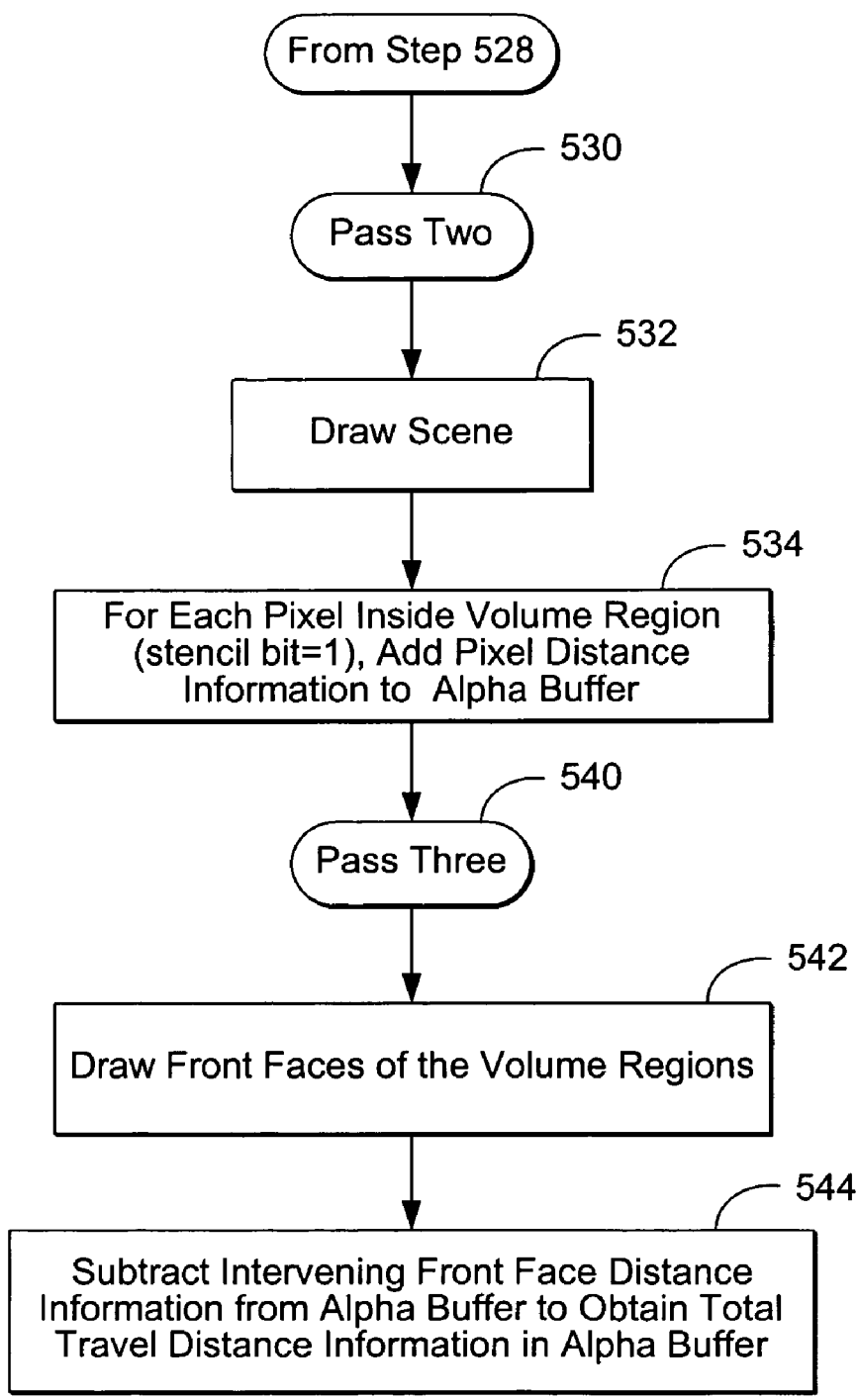
Figure 6:
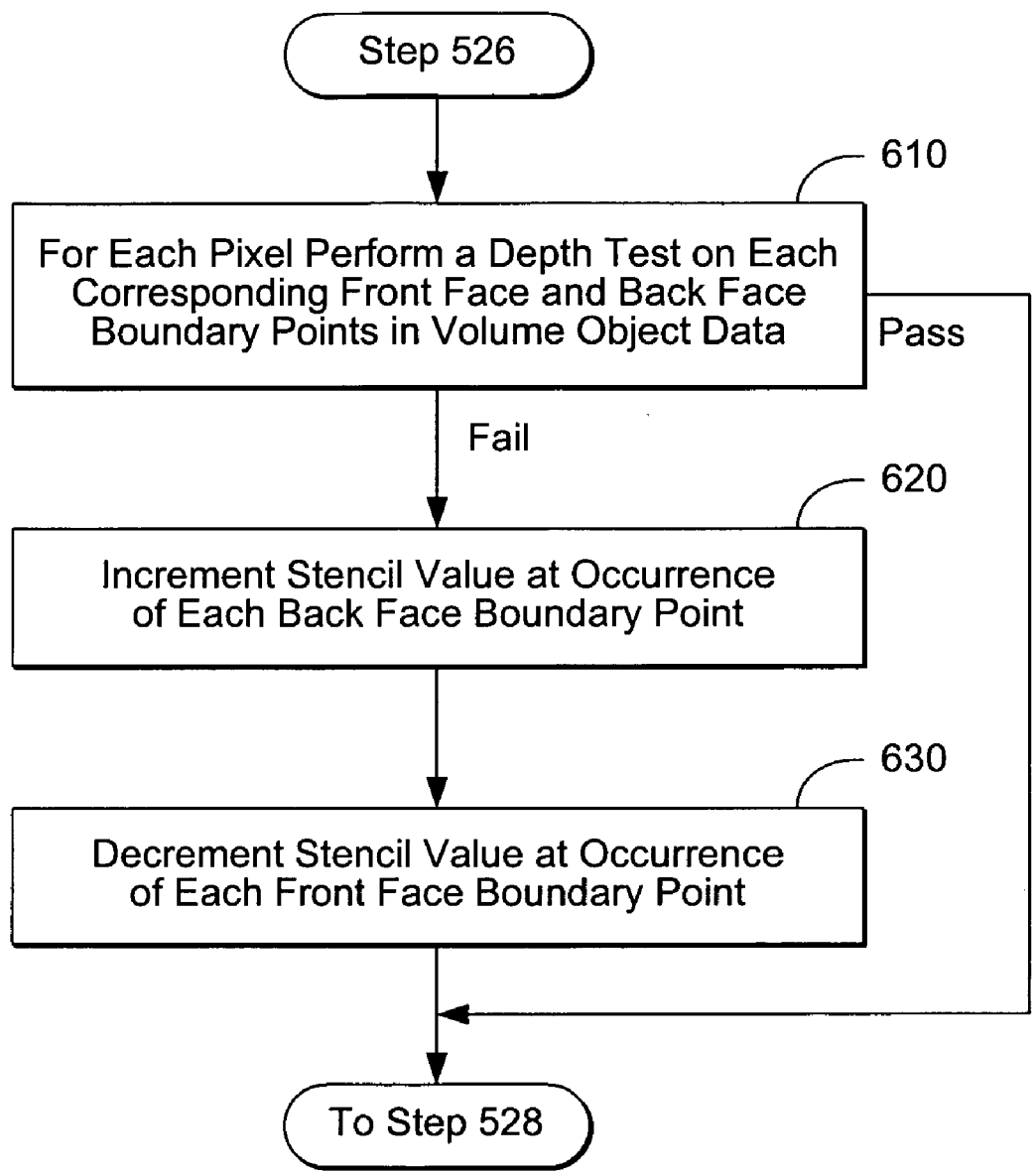
FIG. 6 is a flowchart diagram showing further detail of a routine for setting a stencil value to indicate when a pixel is inside a volume.

FIG. 4 is a flowchart diagram of a routine 400 for rendering volumetric fog or other gaseous phenomena using an alpha channel (steps 410–440). FIGS. 5A and 5B are a flowchart diagram of a multipass routine that implements step 420. FIG. 6 is a flowchart diagram showing step 526 in further detail according to an example implementation. FIGS. 7A–7F are diagrams of example bounded fog regions used to describe the operation of routine.

With respect to FIG. 4, volume object data that defines one or more three-dimensional bounded volume regions is received (step 410). A volume region can be any three-dimensional bounded region in a scene. For example, a volume region can be an area of fog (also called a fog object). A volume region can represent any gaseous phenomenon including fog. Volume object data can be per vertex, per fragment, or other types of geometry data that define the three-1g dimensional bounded volume region in a coordinate space.

In step 412, a scene is rendered to set the contents of a color buffer to scene color. For example, graphics data (such as, geometry data for a scene) can be provided by an application to a graphics subsystem for processing. The graphics data is then processed to obtain pixel data for a frame which is stored in a frame buffer. The pixel data includes color information representative of the scene to be rendered. This color information is also referred to as "scene color."

In step 420, travel distance information is obtained in an alpha channel. "Travel distance information" refers to any function of component distances that are defined with respect to respective three-dimensional bounded volume regions covered by a pixel. "Scaled traveled distance information" refers to travel distance information which is scaled. "Total travel distance information" refers to a sum of distances through each three-dimensional bounded volume region along a ray between a respective pixel and a reference point. "Scaled traveled distance information" refers to total travel distance information which is scaled. Travel distance information obtained in an alpha channel can include, but is not limited to, travel distance information, scaled travel distance information, total travel distance information, and/or scaled total travel distance information Obtaining total travel distance information in an alpha channel in step 420 is described in further detail below with respect to implementations in FIGS. 5A, 5B, 6 and 7A–7F.

In step 430, travel distance information in the alpha channel is then converted to a fog factor (also called an attenuation factor). In step 440, a blending operation blends scene color with fog color based on the fog factor output from step 430. In this way, scene color is blended with fog color to generate a final display image. Any conventional fog equation and blending operation can be used to implement steps 430 and 440 as would be apparent to a person skilled in the art given this description. See, e.g., similar steps for converting travel distance information to a fog factor and blending a scene color and fog color as described in the co-pending application by R. Mech, "Rendering Volumetric Fog and Other Gaseous Phenomena", filed concurrently herewith and incorporated in its entirety herein by reference). The display image includes the scene and a simulation of gaseous phenomena in the volume regions. For example, the scene can include a simulation of patchy fog, clouds, or other gases. In one example, the gases have a constant density and color. In other examples, the gases can vary in density and color.

Figure 7B:
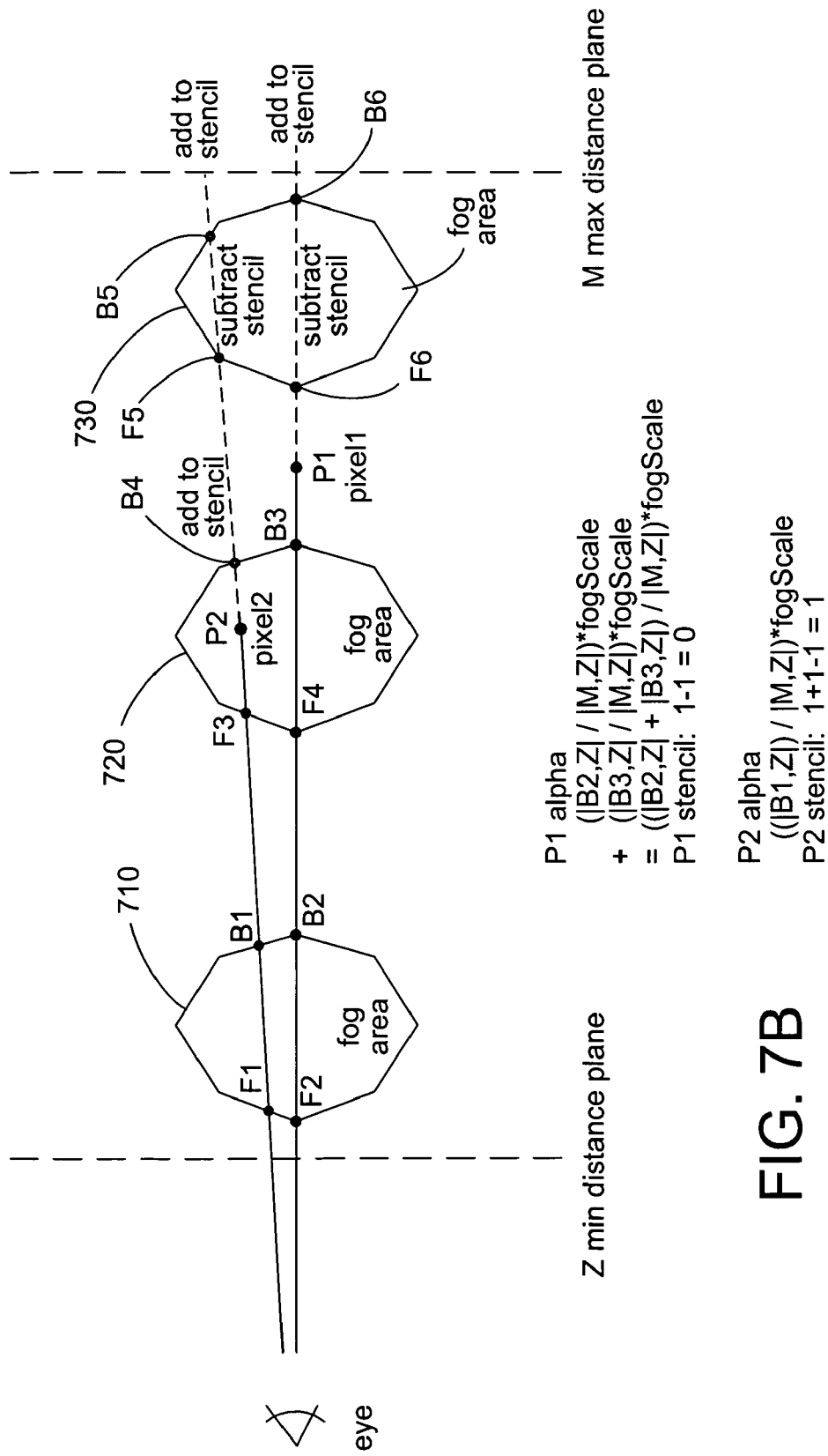

In one example implementation shown in FIGS. 5A and 5B, step 420 is implemented as a multipass routine (steps 502–544). Step 526 is shown in further detail with respect to an example implementation in FIG. 6. To further illustrate the operation of the multipass routine, reference is also made to an example in FIGS. 7A–7F. This example shows two pixels P1, P2 being rendered in a scene having three volume regions 710–730 (also called "fog areas" or "fog regions"). For instance, FIG. 7A shows an example of the output of previous step 412 where a scene is drawn relative to an eye-point. A scene color for each of the pixels is stored in the color buffer of a frame buffer. Only two pixels P1, P2 are shown in detail in the interest of clarity. As shown in FIG. 7A, after step 412, the color for pixel P1 includes P1 scene color. Similarly, the color for pixel P2 includes P2 scene color.

In step 502, an alpha buffer is initialized to zero. The alpha buffer includes an alpha channel for each pixel of a frame. The alpha channel can have any number of bits. In one example, an eight-bit alpha channel is used. Multipass routine 420 includes three passes (520, 530 and 540).

Pass One begins (step 520) and proceeds to step 521. In step 521, a texture coordinate generator is initialized. For example, in one implementation, using, e.g., OPENGL® software, a texgen is initialized. The texgen is a functionality that enables a coordinate value to be converted to a scaled texture coordinate value. A one-dimensional texture having texels with values that range from a minimum value to a maximum value is also loaded. For example, the texel values can be 8-bit texels and range from 0 to 255. In other examples, a smaller or greater number of bits are used to decrease or increase resolution. In step 522, a stencil buffer is initialized to 0. For example, a stencil bit associated with each pixel is set to 0.

In step 524, front and back faces of the volume regions are drawn. While the drawing step 524 is carried out, a stencil value setting step 526 and a distance information adding step 528 are also performed. In step 526, the stencil value is set to indicate when a respected pixel is inside a volume region. Certain operations need only be performed upon pixels that are inside a volume region. By setting a stencil bit to equal 0 when a pixel is outside of the one or more fog objects and 1 when a pixel is inside any fog object, pixel processing operations related to pixels inside the fog objects are not performed on pixels outside the fog objects.

One example implementation for setting the stencil value is shown in FIG. 6 (steps 610–630). Steps 610–630 are carried out for each pixel in a frame corresponding to a scene to be rendered. In step 610, a depth test is performed on each corresponding front face and back face boundary points in the volume object data. When the depth pass passes, control proceeds to step 528. When the depth test fails, this indicates a condition where the back face or front face boundary point is located behind a respected pixel. The stencil bit value is then incremented by one at the occurrence of each back face boundary point (step 620). The stencil bit value is decremented at the occurrence of each front face boundary point (step 630). In this way, steps 620 and 630 act to set a stencil bit value that indicates whether a respective pixel is inside a volume region.

For example, as shown in FIG. 7B, pixel P1 is located outside of all of the fog objects 710–730. The depth of pixel P1 relative to the eyepoint is in between fog object 720 and fog object 730. Accordingly, boundary points in the furthest fog object 730 from the eye will fail a depth test with respect to pixel P1. Step 620 will increment (or add to) the stencil value by 1 at the occurrence of the back face boundary point B6. Step 630 will decrement (or subtract from) the stencil bit value by 1 at the occurrence of front face boundary point F6.

Pixel P2 is located at a depth inside fog object 720. Accordingly, the stencil bit value is incremented at the occurrences of back face boundary points B4 and B5 in step 620. The stencil bit value is decremented at the occurrence of front face boundary point F5 in step 630. As a result, the final stencil bit value after steps 620 and 630 is equal to one for pixel P2, indicating that the pixel is inside fog object 720. The final result of steps 620 and 630 for pixel P1 equals zero, indicating that pixel P1 is outside of the fog objects 710–730.

In step 528, intervening back face distance information (BFDI) is added to the alpha buffer. The intervening back face distance information can be any distance which is a function of the distance between a reference point and the boundary point on a back face of a fog object that intervenes between the eye point and a respected pixel. For example, as shown in FIG. 7B, pixel P1 has two intervening back face points B2, B3. Points B2 and B3 correspond to boundary points on the back faces of respective fog objects 710–720 that intercept a ray drawn from a reference point to pixel P1. In practice, the reference point can be the eye point, a minimum distance plane Z, or other convenient reference point location. In one example implementation as shown in FIG. 7B, the intervening back face distance information is equal to a scaled value between 0 and 1. This scaled value is scaled to the distance (M,Z) between minimum distance plane Z and maximum distance plane M. A fog scale value denoted by the variable "fogScale" is also used to scale the BFDI. The fog scale value is set by a user or to a default value to further control scaling. Similar intervening back face distance information (BFDI) for boundary point B3 is also added to the alpha buffer.

As a result of step 528, for pixel P1 intervening back face distance information for boundary points B2 and B3, denoted BFDI (B2) and BFDI (B3), is summed and added (or accumulated) in an alpha buffer. As shown in FIG. 7B the contents of alpha buffer after step 528 for pixel PI equals a scaled intervening back face distance information value, BFDI(P1), given by the following equation 1:

$$BFDI(P1)=(|B2,Z|+|B3,Z|)*(fogScale/|M,Z|) \quad \text{(Eq. 1)};$$

which equals a sum of the magnitudes of the distances between the minimum distance plane Z and back face boundary point B2 and the minimum distance plane Z and the back face boundary point B3 scaled by a scale factor. The scale factor is equal to a fogScale value divided by the magnitude of the distance between the minimum distance plane Z and maximum distance plane M. Similarly, the contents of alpha buffer after step 528 for pixel P2 equals a scaled intervening back face distance information value, BFDI(P2), given by the following equation 2:

$$BFDI(P2)=|B1,Z|*(fogscale/|M,Z|) \quad \text{(Eq. 2)};$$

which equals the magnitude of the distance between the minimum distance plane Z and back face boundary point B1 scaled by a scale factor. The scale factor is equal to a fogScale value divided by the magnitude of the distance between the minimum distance plane Z and maximum distance plane M.

Next, pass two 530 is performed (steps 532–534). In step 532, the scene excluding volume regions is drawn. During the drawing, pixel distance information is added to the alpha buffer (steps 534). Step 534 is carried out only for pixels inside a volume region. These pixels are identified by the stencil bit set to 1 from step 526. The pixel distance information is a distance which is a function of the distance from a reference point to a respective pixel in a coordinate space. The reference point can be an eyepoint, a minimum distance plane Z, or other reference location. In step 534, the pixel distance information is added to the contents of the alpha buffer.

Figure 7C:
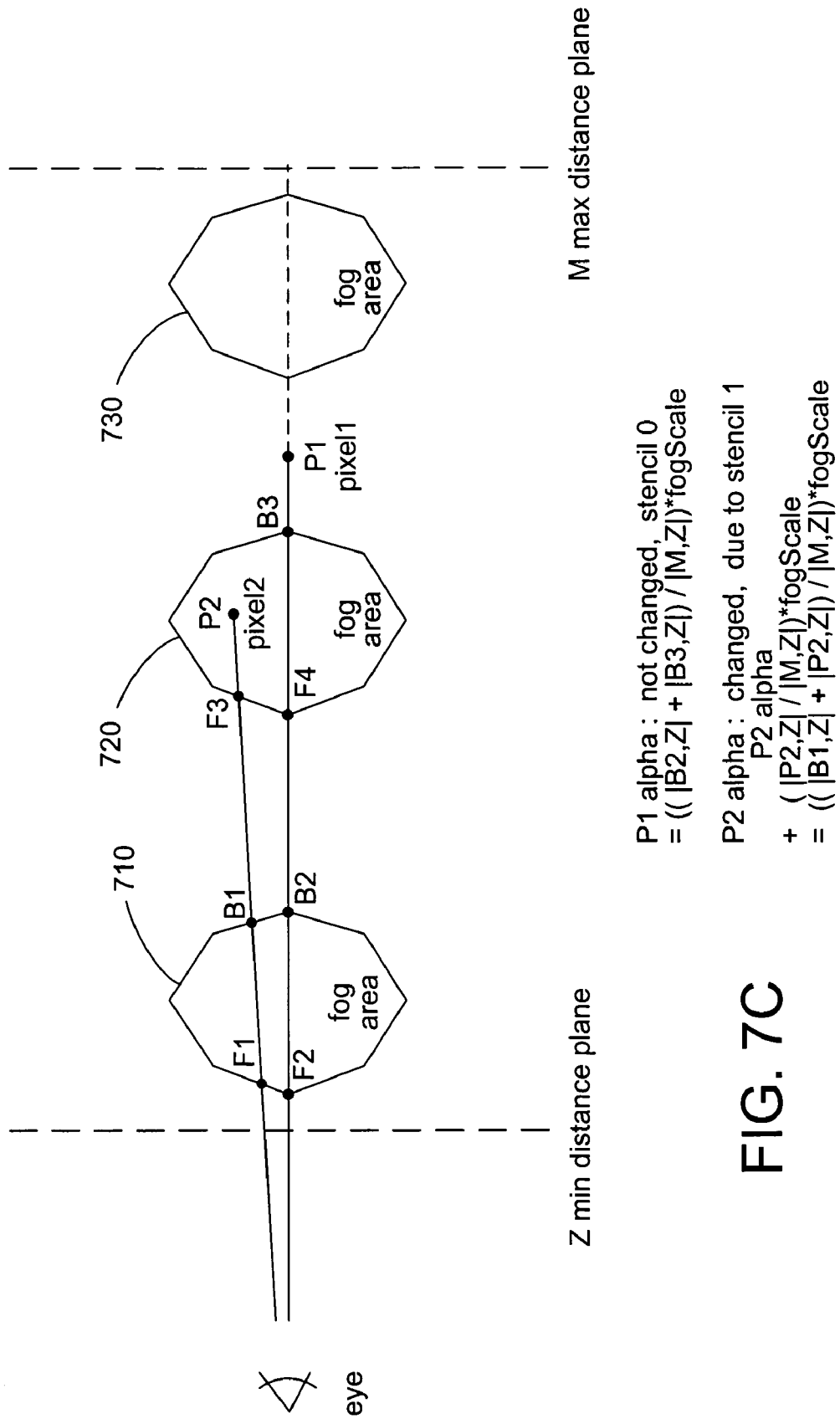

FIG. 7C shows the example where pixel distance information for pixel P2 is added to the alpha buffer. In this example, pixel distance information for pixel P2, denoted as PDI(P2), is given by the following equation 3:

$$PDI(P2)=(|B1,Z|+|P2,Z|)*(fogScale/|M,Z|) \quad \text{(Eq. 3)};$$

where the contents of the alpha buffer for pixel P2 is equal to the sum of the magnitude between boundary point B1 and Z and the magnitude of the distance between point P2 for pixel P2 and Z, scaled by a scale factor. The scale factor is equal to a fogScale value divided by the magnitude of the distance between the minimum distance plane Z and maximum distance plane M. On the other hand, after step 534, the content of the alpha buffer for pixel P1 is not changed since the stencil bit is set equal to 0.

Next, Pass Three is performed (steps 542–544). In step 542, front faces of the volume regions are drawn. During the drawing of the front faces of the volume regions, a step 544 is performed. In step 544, intervening front face distance information (FFDI) is subtracted from the alpha buffer for respective pixels. This subtraction results in a final accumulated alpha buffer value that equals a total travel distance information. Intervening front face distance information is a function of any distance from a front face to a reference point in front of a pixel. The reference point can be the eye point, a minimum distance plane Z, or other convenient reference point location.

In one example implementation, the subtracted front faced distance information is equal to a function of the distance from each front face to a reference point scaled to a region between a minimum distance plane Z and a maximum distance plane M. In the example shown in FIG. 7D, for pixel P1, the subtracted intervening front face distance information FFDI due to boundary points F2 and F4, is equal to the following respective equations 4 and 5:

$$FFDI(P1,F2)=|F2,Z|*(fogScale/|M,Z|) \quad \text{(EQ. 4); and}$$

$$FFDI(P1,F4)=|F4,Z|*(fogScale/|M,Z|) \quad \text{(EQ. 5).}$$

This subtraction yields a scaled total travel distance information (scaled TTDI) in the alpha channel of P1 equal to the following equation 6:

$$TTDI(P1)=(|F2,B2|+|F4,B3|)*(fogScale/|M,Z|) \quad \text{(EQ. 6),}$$

which equals a sum of the magnitudes of the distances between the boundary points F2 and B2 and the boundary points F4 and B3, scaled by a scale factor. The scale factor is equal to a fogScale value divided by the magnitude of the distance between the minimum distance plane Z and maximum distance plane M.

Similarly, for pixel P2 intervening front face distance information FFDI due to boundary points F1 and F3 is subtracted from the alpha channel of pixel P2. This subtraction yields a scaled total travel distance information (scaled TTDI) in the alpha channel of P2 equal to the following equation 7:

$$TTDI(P2)=(|F1,B1|+|F3,P2|)*(fogScale/|M,Z|) \quad (EQ. 7),$$

which equals a sum of the magnitudes of the distance between the boundary points F1 and B1 and the distance between boundary point F3 and pixel location P2 scaled by a scale factor. The scale factor is equal to a fogScale value divided by the magnitude of the distance between the minimum distance plane Z and maximum distance plane M.

Figure 7D:
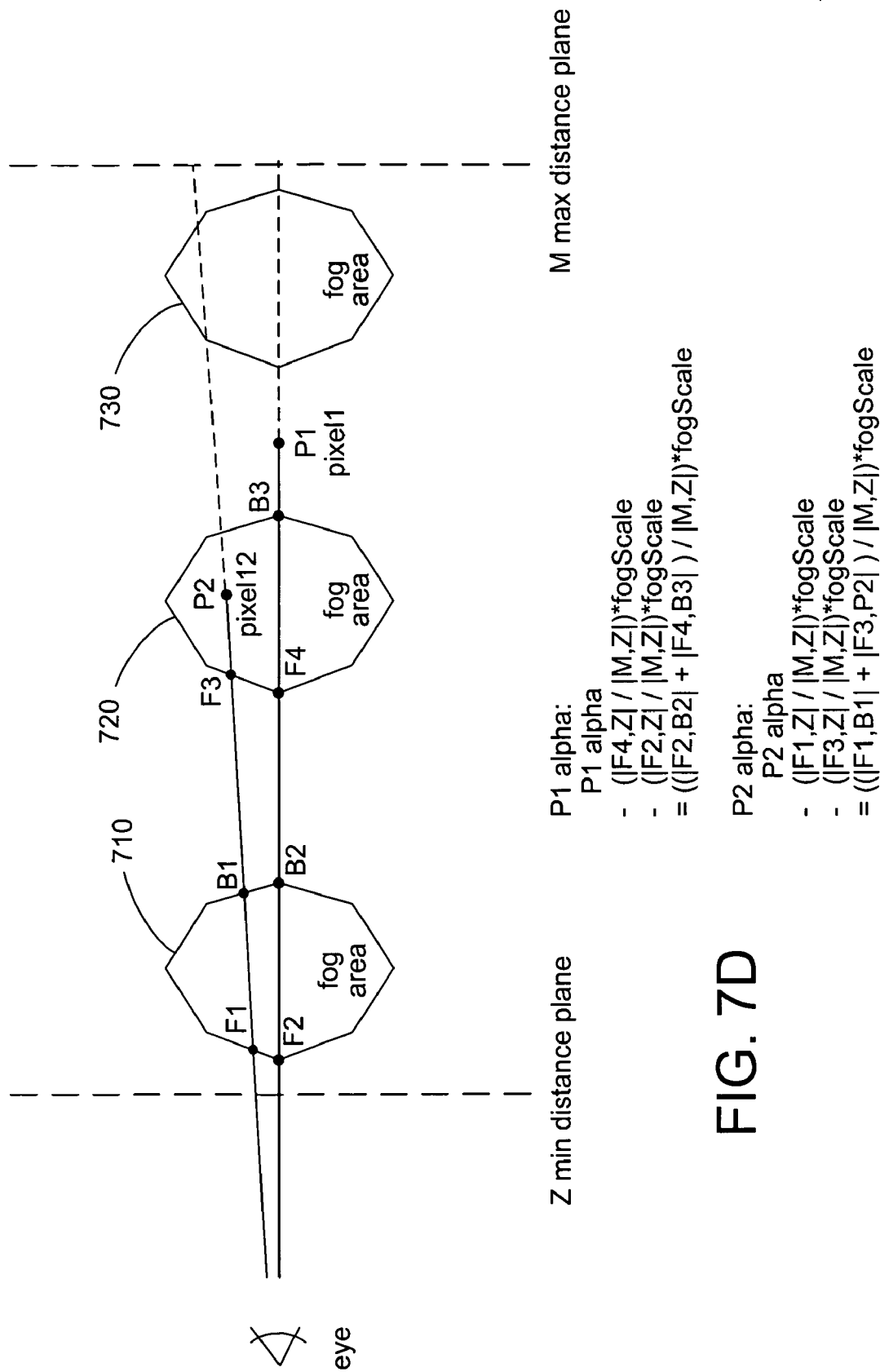
Figure 7E:
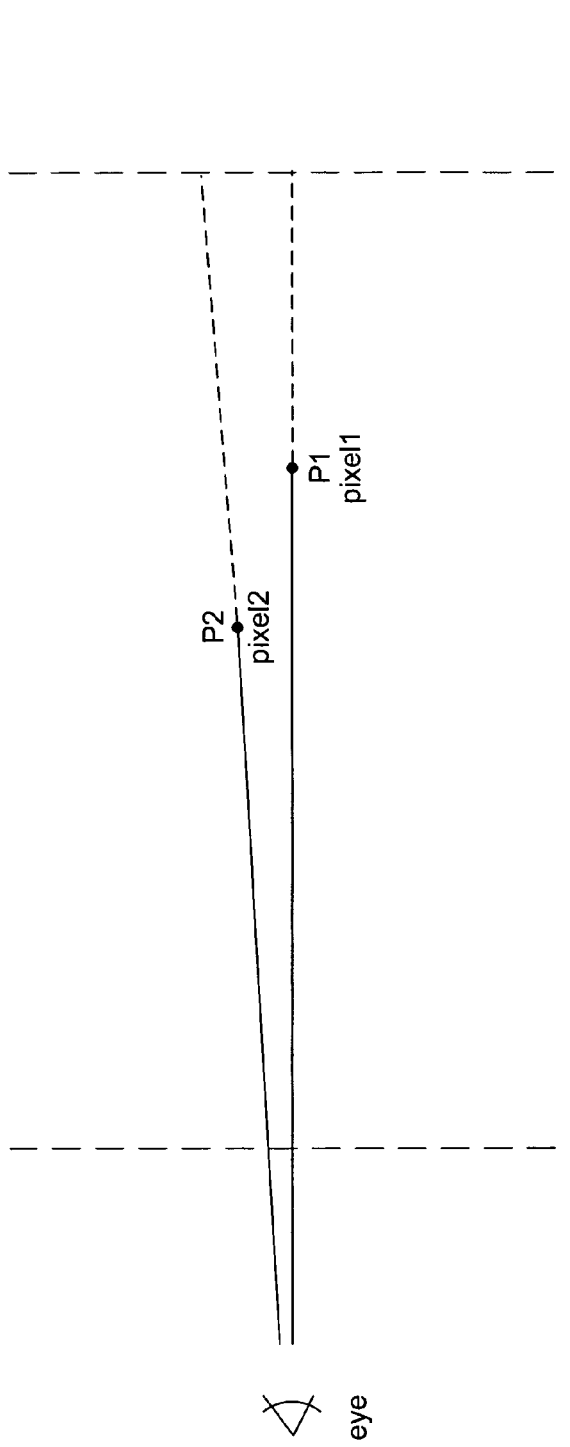

Control then returns to step 430. As described earlier, in step 430 the travel distance from information stored in the alpha channel is converted to a fog factor (also denoted in results as P1 alpha and P2 alpha in FIGS. 7E and 7F). FIG. 7E shows an example of the travel distance information for pixels P1, P2 (obtained in step 544) converted to a fog factor in the alpha channel according to step 430. Cases of linear fog and exponential fog (exp or exp2 fog) are shown. In the case of linear fog, a conventional linear fog equation is calculated by multiplying the travel distance information in the alpha channel (denoted in FIG. 7E as P1 alpha or P2 alpha) by a fog density value (fogDensity) and by a scale factor. The scale factor is equal to the magnitude of the distance between minimum distance plane Z and maximum distance plane M divided by a fogscale value. The result is then written in the alpha channel to replace the travel distance information. In the case of an exponential fog, the travel distance information is scaled by a scale factor and a pixelmap look-up operation is performed to obtain an exponential function value of the travel distance information. See, FIG. 7E.

In step 440, scene color is blended with fog color based on the fog factor.

Figure 7F:
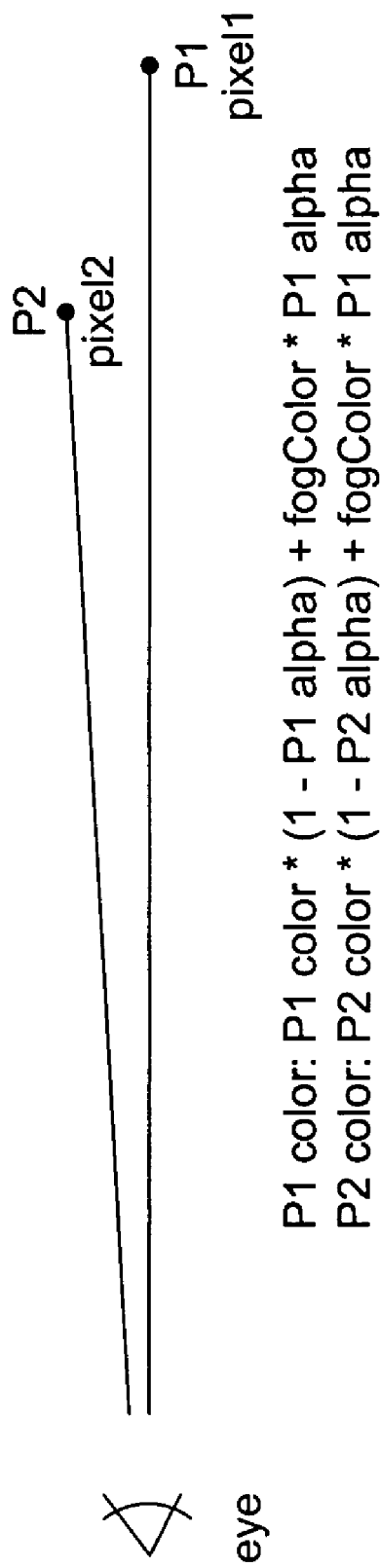

FIG. 7F shows an example of the resultant pixel colors obtained in step 440 when scene color is blended with fog color based on the fog factor. Any type of blending can be used. FIG. 7F shows linear blending of the scene color and fog color based on the fog factor (P1 alpha and P2 alpha) calculated in step 430.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    determining a distance between a user and a boundary of a gaseous volume; and
    storing the distance in an alpha channel to arrive at an alpha value.
2. The method as recited in claim 1 further comprising blending a color pixel outside the gaseous volume with a color pixel inside the gaseous volume based on the alpha value.
3. The method as recited in claim 1, wherein determining a distance comprises adding and subtracting a distance from the user to a front or back face of the gaseous volume.
4. The method as recited in claim 1 wherein storing the distance in alpha channel to arrive at an alpha value comprises calculating a total travel distance through the gaseous volume.
5. The method as recited in claim 2, wherein blending results in a blended pixel and further comprising displaying the blended pixel on a display screen.
6. The method as recited in claim 1 wherein the gaseous volume is a three dimensional bounded volume region in a scene.
7. One or more computer-readable media comprising computer executable instructions that, when executed, perform a method comprising:
    determining a distance between a user and a boundary of a gaseous volume; and
    storing the distance in an alpha channel to arrive at an alpha value.
8. A system for displaying a volumetric gaseous phenomenon in a scene, comprising:
    an alpha channel, configured to receive travel distance information about the gaseous phenomenon;
    a fog unit, configured to receive the travel distance information from the alpha channel and covert the information to a fog factor value; and
    a blending unit, configured to blend a color of the gaseous phenomenon with a color from the scene based on the fog factor value to produce a pixel.
9. The system as recited in claim 8 further comprising a frame buffer configured to store the pixel.
10. The system as recited in claim 8 further comprising a frame buffer configured to store the pixel and a display unit configured to render the pixel for display on a screen.
11. The system as recited in claim 8 wherein the travel distance information describes a distance between a user and a boundary of a gaseous volume.
12. The system as recited in claim 8 wherein the system is a flight simulator.
13. The system as recited in claim 8 wherein the system is a video game.
14. A method for rendering volumetric fog or other gaseous phenomena, comprising:
    receiving volume object data that defines at least one three-dimensional bounded volume region; and
    obtaining travel distance information in an alpha channel, the travel distance information being a function of distances in each three-dimensional bounded volume region having a face between a respective pixel and a reference point.
15. The method of claim 14, further comprising converting travel distance information in the alpha channel to obtain a fog factor.
16. The method of claim 15, further comprising blending scene color and fog color based on the fog factor.
17. The method of claim 14, wherein the travel distance information comprises total travel distance information, the total travel distance information being equal to the sum of distances through each three-dimensional bounded volume region along a ray between a respective pixel and a reference point.
18. The method of claim 14, wherein the travel distance information comprises scaled total travel distance information, the scaled total travel distance information being equal to sums of distances through each three-dimensional bounded volume region along a ray between a respective pixel and a reference point, scaled by a scaling value.

19. A system for rendering volumetric fog or other gaseous phenomena, comprising:
  means for receiving volume object data that defines at least one three-dimensional bounded volume region; and
  means for obtaining travel distance information in an alpha channel, the travel distance information being a function of distances in each three-dimensional bounded volume region having a front face between a respective pixel and a reference point.

20. A system for rendering volumetric fog or other gaseous phenomena, comprising:
  apparatus for receiving volume object data that defines at least one three-dimensional bounded volume region;
  a texture memory configured to store a one-dimensional texture;
  a graphics subsystem that obtains travel distance information in an alpha channel, the travel distance information being a function of distances in each three-dimensional bounded volume region having a front face between a respective pixel and a reference point; and
  an alpha buffer that stores the obtained travel distance information in an alpha channel for each pixel that covers one or more of the three-dimensional bounded volume regions.

21. The system of claim 20, wherein said graphics subsystem includes a texture coordinate generator.

22. The system of claim 21, wherein said texture coordinate generator comprises a texgen.

23. A computer usable storage medium having stored therein instructions configured to render images having atmospheric effects by causing one or more processors to:
  define volume object data corresponding to at least one three-dimensional bounded volume region;
  derive one-dimensional texture information;
  store the one-dimensional texture information in texture memory;
  obtain travel distance information that is a function of distances in each three-dimensional bounded volume region having a front face between a respective pixel and a reference point; and
  store data representing the obtained travel distance information in an alpha buffer coupled to an alpha channel for each pixel that covers one or more of the three-dimensional bounded volume regions.

24. The computer usable storage medium of claim 23, wherein the instructions configured to render images having atmospheric effects stored therein by causing one or more processors to obtain travel distance information further are configured to add intervening back face distance information to the alpha buffer in a first pass of a multipass routine by calculating one or more back face distance information values $BFDI(P_N)$ for one or more respective points $P_N$.

25. The computer usable storage medium of claim 23, wherein the instructions configured to render images having atmospheric effects stored therein by causing one or more processors to obtain travel distance information further are configured to add intervening front face distance information to the alpha buffer in a first pass of a multipass routine by calculating one or more front face distance information values $FFDI(P_N)$ for one or more respective points $P_N$.

26. The computer usable storage medium of claim 23, wherein the instructions configured to render images having atmospheric effects stored therein by causing one or more processors to obtain travel distance information further are configured to effectuate first and second passes of a multipass routine, the second pass including adding intervening back face distance information to the information stored in the alpha buffer for only those pixels inside a volume region of fog by calculating one or more pixel distance information or PDI values $PDI(P_N)$ for one or more respective points $P_N$.

27. The computer usable storage medium of claim 23, wherein the instructions configured to render images having atmospheric effects stored therein by causing one or more processors to obtain travel distance information further are configured to effectuate first, second and third passes of a multipass routine, the third pass including subtracting intervening front face distance information FFDI from the alpha buffer information to provide total travel distance information.

28. A graphics engine including one or more processors and computer-readable code configured to cause the one or more processors to perform acts of:
  receiving volume object data that defines at least one three-dimensional bounded volume region; and
  obtaining travel distance information in an alpha channel, the travel distance information being a function of distances in each three-dimensional bounded volume region having a face between a respective pixel and a reference point;
  representing the travel distance information as an attenuation factor; and
  converting the attenuation factor to a fog factor.

29. The processor of claim 28, further comprising computer-readable code configured to cause the one or more processors to perform acts including blending scene color and fog color based on the fog factor.

30. The processor of claim 28, further comprising computer-readable code configured to cause the one or more processors to perform acts including deriving scaled total travel distance information, the scaled total travel distance information being equal to sums of distances through each three-dimensional bounded volume region along a ray between a respective pixel and a reference point, scaled by a scaling value.

* * * * *

UNITED STATES PATENT AND TRADEMARK OFFICE
CERTIFICATE OF CORRECTION

PATENT NO.        : 6,940,504 B1
APPLICATION NO. : 09/991526
DATED              : September 6, 2005
INVENTOR(S)      : Radomir Mech et al.

It is certified that error appears in the above-identified patent and that said Letters Patent is hereby corrected as shown below:

On the Title Page Item -56-, under "Other Publications", line 3, after "USA" delete ";" and insert -- : --, therefor.

On Sheet 1 of 13, in FIG. 1, (Pointer 130), line 1, delete "Opertating" and insert -- Operating --, therefor.

On Sheet 11 of 13, in FIG. 7D, (Below P2), line 1, delete "pixel12" and insert -- pixel2 --, therefor.

In column 2, line 1, delete "fill-screen" and insert -- full-screen --, therefor.

In column 2, line 21, delete "real time" and insert -- real-time --, therefor.

In column 2, line 23, below "patch fog" insert -- What is needed is way to render in real-time, complex scenes that include patchy fog and/or other gaseous phenomena such that efficiency and high quality visual realism is achieved. --. (as a new paragraph).

In column 3, line 26, after "at" delete "a".

In column 4, line 9, delete "implemenation" and insert -- implementation --, therefor.

In column 4, line 11, delete "real time" and insert -- real-time --, therefor.

In column 4, line 23, delete "(APT)" and insert -- (API) --, therefor.

In column 6, line 5, delete "removeable" and insert -- removable --, therefor.

In column 6, line 6, after "cartridge" insert -- and cartridge --.

In column 6, line 7, delete "removeable" and insert -- removable --, therefor.

In column 6, line 9, delete "removeable" and insert -- removable --, therefor.

In column 6, line 12, delete "implemenation" and insert -- implementation --, therefor.

In column 7, line 23, after "three-" delete "1g".

In column 9, line 44, delete "PI" and insert -- P1 --, therefor.

UNITED STATES PATENT AND TRADEMARK OFFICE
CERTIFICATE OF CORRECTION

PATENT NO. : 6,940,504 B1
APPLICATION NO. : 09/991526
DATED : September 6, 2005
INVENTOR(S) : Radomir Mech et al.

It is certified that error appears in the above-identified patent and that said Letters Patent is hereby corrected as shown below:

In column 10, line 51, delete "(fogScale/$M,Z$)" and insert
-- ($fogScale/|M,Z|$) --, therefor.

In column 10, line 61, delete "P4" and insert -- F4 --, therefor.

In column 12, line 9, in Claim 6, delete "three dimensional" and insert
-- three-dimensional --, therefor.

Signed and Sealed this

Twenty-first Day of July, 2009

JOHN DOLL
*Acting Director of the United States Patent and Trademark Office*